US011308239B2

(12) United States Patent
Moss

(10) Patent No.: US 11,308,239 B2
(45) Date of Patent: Apr. 19, 2022

(54) JITTER ATTACK PROTECTION CIRCUIT

(71) Applicant: Seagate Technology LLC, Cupertino, CA (US)

(72) Inventor: Robert Wayne Moss, Windsor, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 45 days.

(21) Appl. No.: 15/980,299

(22) Filed: May 15, 2018

(65) Prior Publication Data
US 2019/0303624 A1 Oct. 3, 2019

Related U.S. Application Data

(60) Provisional application No. 62/650,557, filed on Mar. 30, 2018.

(51) Int. Cl.
*G06F 21/72* (2013.01)
*H04L 9/00* (2022.01)

(52) U.S. Cl.
CPC .............. *G06F 21/72* (2013.01); *H04L 9/003* (2013.01); *H04L 9/005* (2013.01)

(58) Field of Classification Search
CPC .......... G06F 21/72; H04L 9/003; H04L 9/005
USPC ......................................................... 713/189
See application file for complete search history.

(56) References Cited

U.S. PATENT DOCUMENTS

| 5,231,636 | A | 7/1993 | Rasmussen |
| 6,654,884 | B2 | 11/2003 | Jaffe et al. |
| 6,748,535 | B1 | 6/2004 | Ryan, Jr. et al. |
| 6,807,232 | B2 | 10/2004 | Nicholson et al. |
| 7,417,468 | B2 | 8/2008 | Verbauwhede et al. |
| 7,426,629 | B2 | 9/2008 | Piry et al. |
| 7,599,488 | B2 | 10/2009 | Kocher et al. |
| 7,639,058 | B2 | 12/2009 | Kuroawa et al. |
| 7,870,336 | B2 | 1/2011 | Erlingsson et al. |
| 8,334,705 | B1 | 12/2012 | Gunnam et al. |
| 8,427,194 | B2 | 4/2013 | Deas et al. |
| 8,635,467 | B2 | 1/2014 | Gunnam et al. |
| 8,766,707 | B1 | 7/2014 | Younger et al. |
| 8,879,724 | B2 | 11/2014 | Kocher et al. |
| 9,250,671 | B2 | 2/2016 | Tucker |
| 9,335,809 | B2 | 5/2016 | Younger et al. |

(Continued)

*Primary Examiner* — Abiy Getachew
*Assistant Examiner* — Mohammad S Shams
(74) *Attorney, Agent, or Firm* — Hall Estill Law Firm

(57) ABSTRACT

Method and apparatus for protecting against a jitter attack upon a cryptographic processing device. In some embodiments, the cryptographic processing circuit is configured to perform a cryptographic function on a set of input data to generate a corresponding set of transformed output data. An input line supplies an input signal used by the cryptographic processing IC during execution of the cryptographic function. A monitor circuit monitors the input signal, and temporarily disables the cryptographic processing IC when time-varying changes to the input signal indicate a jitter attack may be taking place. The input signal may be a source voltage, and voltage transitions in the source voltage can be monitored. Alternatively, the input signal may be a clock signal, and frequency variations in the clock signal can be monitored. The monitor circuit may be arranged on a power island to maintain power during power fluctuations.

20 Claims, 4 Drawing Sheets

(56) References Cited

U.S. PATENT DOCUMENTS

| | | | |
|---|---|---|---|
| 9,343,162 B2 | 5/2016 | Tasher et al. | |
| 9,411,394 B2 | 8/2016 | Younger et al. | |
| 9,436,603 B1 | 9/2016 | Pohlack | |
| 9,594,928 B1* | 3/2017 | Langhammer | H04L 9/0643 |
| 9,941,880 B1* | 4/2018 | Lesea | H01L 23/576 |
| 2002/0124178 A1* | 9/2002 | Kocher | G06F 7/00 |
| | | | 713/193 |
| 2003/0185392 A1* | 10/2003 | Sun | G06F 7/588 |
| | | | 380/46 |
| 2004/0260932 A1* | 12/2004 | Blangy | H04L 9/0662 |
| | | | 713/189 |
| 2005/0102545 A1* | 5/2005 | Clavequin | G06F 1/10 |
| | | | 713/401 |
| 2007/0076890 A1* | 4/2007 | Muresan | H04L 9/0625 |
| | | | 380/287 |
| 2007/0220263 A1* | 9/2007 | Ziener | G06F 21/81 |
| | | | 713/176 |
| 2008/0059826 A1* | 3/2008 | Kocher | G06F 7/00 |
| | | | 713/340 |
| 2011/0246119 A1* | 10/2011 | Feix | G06F 7/723 |
| | | | 702/117 |
| 2011/0246789 A1* | 10/2011 | Feix | G06F 7/723 |
| | | | 713/190 |
| 2011/0260749 A1* | 10/2011 | Deas | G06F 21/556 |
| | | | 326/8 |
| 2011/0285421 A1* | 11/2011 | Deas | G06F 21/755 |
| | | | 326/8 |
| 2011/0296198 A1* | 12/2011 | Motoyama | G06F 21/602 |
| | | | 713/189 |
| 2011/0299678 A1* | 12/2011 | Deas | H04L 9/003 |
| | | | 380/28 |
| 2012/0204056 A1 | 8/2012 | Airaud et al. | |
| 2013/0007881 A1 | 1/2013 | Liem et al. | |
| 2013/0312110 A1* | 11/2013 | Boulet | G06F 21/77 |
| | | | 726/26 |
| 2014/0250290 A1 | 9/2014 | Stahl et al. | |
| 2014/0263646 A1* | 9/2014 | Manesh | G06K 7/084 |
| | | | 235/440 |
| 2015/0082434 A1 | 3/2015 | Sethumadhavan et al. | |
| 2015/0288524 A1* | 10/2015 | Jaffe | H04L 9/004 |
| | | | 713/176 |
| 2015/0365228 A1 | 12/2015 | Belenky | |
| 2015/0381351 A1* | 12/2015 | Kuenemund | H04L 9/003 |
| | | | 713/189 |
| 2018/0004944 A1* | 1/2018 | Nagata | G06F 11/22 |
| 2018/0039581 A1* | 2/2018 | Hung | G06F 12/0246 |
| 2018/0323960 A1* | 11/2018 | Courtney | H04L 9/005 |
| 2019/0007202 A1* | 1/2019 | Colombo | G06F 13/36 |

* cited by examiner

JITTER ATTACK PROTECTION CIRCUIT

RELATED APPLICATIONS

This application makes a claim of domestic priority to U.S. Provisional Patent Application No. 62/650,557 filed Mar. 30, 2018, the contents of which are hereby incorporated by reference.

SUMMARY

Various embodiments of the present disclosure are generally directed to data security by protecting against a jitter attack.

In accordance with some embodiments, an apparatus has a cryptographic processing integrated circuit (IC) configured to perform a cryptographic function on a set of input data to generate a corresponding set of transformed output data. An input line is configured to provide an input signal used by the cryptographic processing IC during execution of the cryptographic function. A monitor circuit is configured to monitor the input signal and temporarily disable the cryptographic processing IC responsive to a detection of time-varying changes to the input signal indicative of a potential jitter attack upon the cryptographic processing IC.

In further embodiments, a data storage device has a non-volatile memory and a controller circuit configured to direct a transfer of data between the NVM and a host device. The controller circuit includes a cryptographic processing circuit configured to perform a cryptographic function on a set of input data to generate a corresponding set of transformed output data. The cryptographic processing circuit receives an input signal from an input line to facilitate execution of the cryptographic function. A monitor circuit is configured to monitor the input signal, and to temporarily disable the cryptographic processing circuit responsive to a detection of time-varying changes to the input signal indicative of a potential jitter attack upon the cryptographic processing circuit.

In further embodiments, a method includes steps of supplying an input signal to a cryptographic processing IC; using the cryptographic processing IC to execute a cryptographic function on a set of input data to generate a corresponding set of transformed output data; monitoring the input signal during the execution of the cryptographic function; and interrupting the execution of the cryptographic function responsive to a detection of time-varying changes to the input signal indicative of a potential jitter attack upon the cryptographic processing circuit.

These and other features and aspects which characterize various embodiments of the present disclosure can be understood in view of the following detailed discussion and the accompanying drawings.

DETAILED DESCRIPTION

Figure 1:
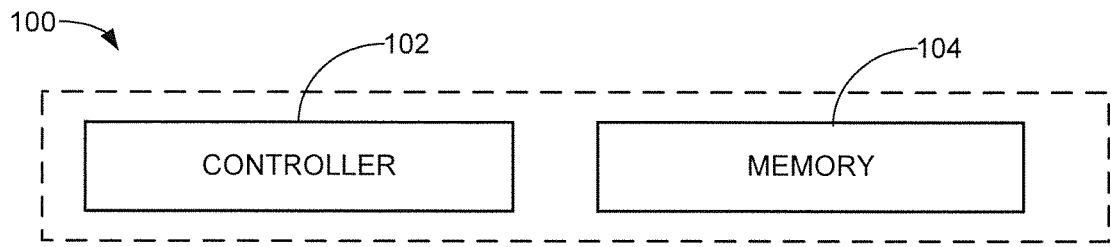
FIG. 1 is a functional representation of a data storage device in accordance with some embodiments.

The present disclosure generally relates to data security, and more particularly to a novel method and apparatus for protecting against jitter attacks in a data storage system.

Data security schemes are used to reduce or eliminate unwanted access to data by unauthorized users of data storage systems. Data security schemes can employ a variety of security techniques in an effort to protect data. Some data security schemes employ cryptographic processes whereby data are processed using a selected cryptographic algorithm, such as an encryption or hash algorithm, to encode data in such a way that the underlying data cannot be easily recovered or otherwise altered by an attacker. A wide variety of cryptographic functions are known in the art.

Cryptographic systems are often configured to protect underlying data from discovery during a direct attack. A so-called side-channel attack is often used by a motivated attacker to glean a side channel, or a separate information stream, from a system that can ultimately reveal important information about the system or data, up to and including decoding of the data protected by the cryptographic algorithm. Side-channel attacks can take a variety of forms such as differential power analysis (DPA) attacks, timing analysis attacks, etc.

One commonly employed side-channel attack is sometimes referred to as a jitter attack. In this scheme, an input signal supplied to a cryptographic processing integrated circuit (IC) device, such as input power used by the device, is repetitively interrupted or otherwise manipulated (e.g., introducing jitter) in an effort to get the IC device into an indeterminate state. From this state, the attacker can analyze the device, such as by examining the output pins, to determine internal register values or other information that may lead the attacker to be able to decode the cryptographic processing that is applied by the device. Clock lines are another form of input signal that can be subjected to a jitter attack.

Various embodiments of the present disclosure are generally directed to an apparatus and method for protecting against a jitter attack. As explained below, some embodiments include a cryptographic processing IC supplied by an input signal line and a monitoring circuit that monitors the input signal line. The input signal can take a variety of forms, such as an input power line used to supply a source voltage, source current or other electrical power input to power the IC device. The input signal may alternatively take the form of an input clock line used to supply a clock signal at a selected frequency, an input PWM signal, a timing signal, etc.

The monitoring circuit is configured to detect the presence of electrical jitter on the input signal line. When the jitter is of sufficient magnitude and duration to place the IC device in an indeterminate state (indicating that a jitter attack may be taking place), the monitoring circuit temporarily disables the IC, which resets the output state and prevents further jitter from affecting the state of the device.

In some cases, the monitoring circuit may be arranged on a power island so as to remain operational irrespective of the state of the input power line feeding the cryptographic processing IC. Other arrangements can be used as well, such as using a separate energy storage device a capacitor, a battery, etc.) to power the monitoring circuit. The monitoring circuit can detect the presence of jitter in a number of ways, such as by accumulating repetitive anomalous events that are present on the input signal line, such as voltage level excursions, deviations in clock frequency, etc.

These and other features and advantages of various embodiments can be understood beginning with a review of FIG. 1 which shows a simplified functional block diagram for a data storage device 100. The device 100 includes a controller 102 and a mass storage memory 104. The controller 102 can take a variety of forms such as a system on a chip (SOC) circuit with one or more programmable processors configured to execute firmware stored in a suitable memory location.

The memory 104 can take a variety of forms and can be used to store user data from a host device. The functionality of the controller 102 and the memory 104 can be incorporated into a single chip, or distributed among different integrated circuit devices and other components such as solid state memory, rotatable magnetic memory, mixtures of various types, etc.

Figure 2:
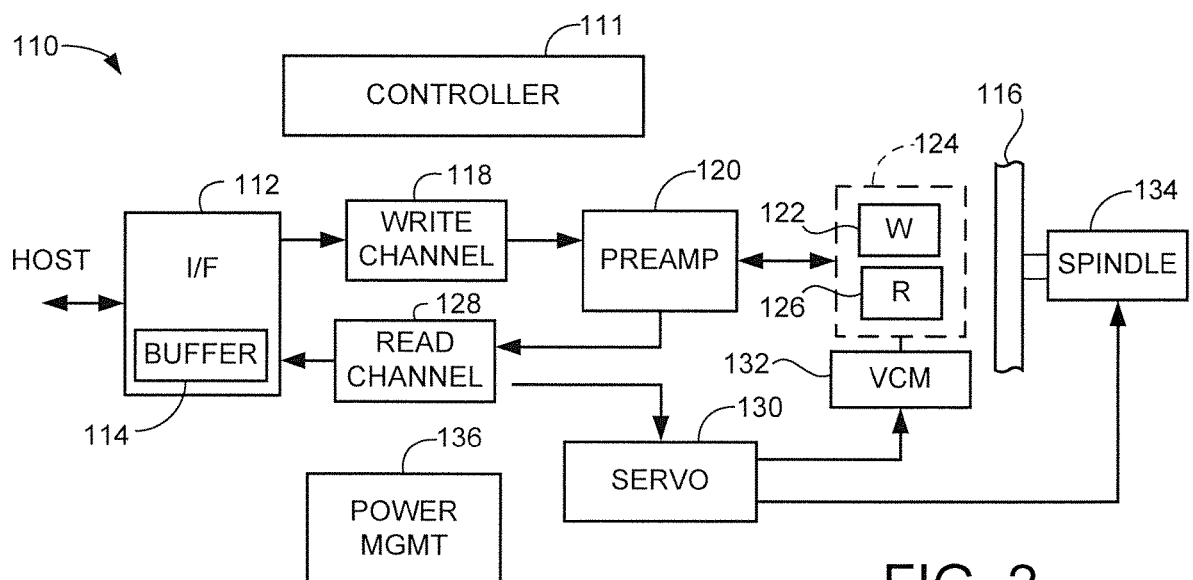
FIG. 2 is a functional representation of the data storage device characterized as a hard disc drive (HDD).

FIG. 2 is a functional block diagram for a data storage device 110 that corresponds to the device 100 of FIG. 1 in some embodiments. The data storage device 110 is characterized for purposes of the present disclosure as a hard disc drive (HDD) that employs perpendicular magnetic recording heads and media to store data to one or more rotatable magnetic recording discs.

The device 110 in FIG. 2 includes a top level controller (SOC) 111. An interface circuit (I/F) 112 communicates with the host device and includes a data buffer 114 to temporarily store data pending transfer between the host device and a rotatable perpendicular data recording medium 116. In many embodiments the data buffer 114 is external to controller 111, such as when an external DRAM is used.

A write channel 118 operates to encode input write data from the host to provide a serialized data stream to a preamplifier/driver (preamp) 120. The preamp 120 provides a sequence of write currents to a perpendicular magnetic write element (W) 122 of a data transducer 124 to write data to the medium 116.

During a readback operation, readback signals are transduced by a magneto-resistive (MR) read element (R) 126 of the data transducer 124. The transduced signals are supplied to the preamp 120. The preamp 120 conditions and amplifies the readback signals and provides the same to a read channel 128. The read channel 128 applies signal processing techniques to recover the originally stored data to the buffer 114 pending subsequent transfer to the host.

During both read and write operations, specially configured servo positioning data on the medium 116 are transduced by the read element 126 and, after demodulation by a portion of the read channel 128, are supplied to a servo control circuit 130. The servo control circuit 130 provides positional control signals to a voice coil motor (VCM) 132 coupled to the data transducer 124 to position the respective write and read elements 122, 126 adjacent various data tracks defined on the medium 116.

The servo control circuit 130 further provides control inputs to a spindle motor 134 which rotates the medium 116 during operation. To avoid damage to the device 110, the servo circuit 130 moves the transducer(s) 124 to a safe parking position, such as on a ramp structure or a landing zone, prior to deactivation of the spindle motor 134.

FIG. 2 further depicts a power management circuit 136. The power management circuit 136 operates to supply electrical power to the various constituent elements of the device. While shown as a separate functional block, portions of the power management circuit 136 may be physically incorporated into other blocks of FIG. 2, such as in the controller 111.

Figure 3:
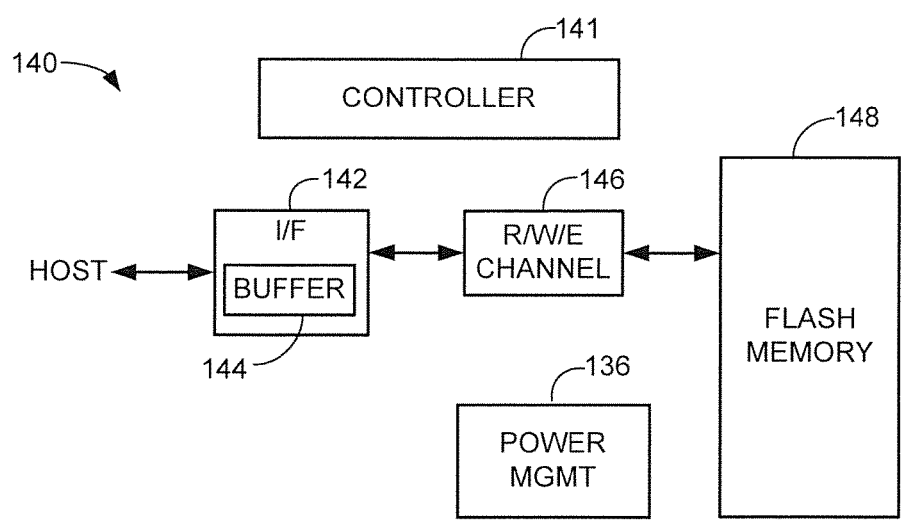
FIG. 3 is a functional representation of the data storage device characterized as a solid state drive (SSD).

FIG. 3 is a functional block diagram for another data storage device 140 that corresponds to the device 100 of FIG. 1 in some embodiments. The data storage device 140 is characterized as a solid state drive (SSD) that employs non-volatile flash memory to store data from the host device.

As with the HDD device 110 of FIG. 2, the SSD device 140 of FIG. 3 includes a top level controller (SOC) 141 and an I/F circuit 142 with a data buffer 144. A read/write/erase (R/W/E) channel 146 provides read, write and erasure capabilities for one or more flash memory arrays 148, although in some embodiments, the R/W/E channel is part of individual dies within the flash memory array 148. The SSD device 140 includes the aforementioned power management circuit 136 to selectively provide electrical power to the various constituent elements in the device.

The storage devices of FIGS. 1-3 are each configured to carry out various forms of cryptographic processing of the data stored in memory. Any number of different forms and types of cryptographic functions can be carried out, such as but not limited to encryption/decryption processing, generation of hash values and encryption keys, data bit scrambling operations, etc.

Figure 4:
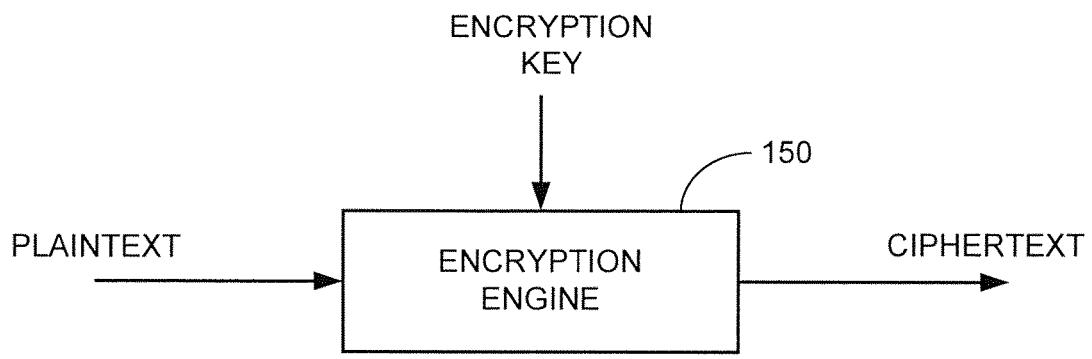
FIG. 4 depicts an encryption engine circuit in accordance with some embodiments of the present disclosure.

FIG. 4 shows an encryption engine 150 that may be incorporated into the controller SOC or other processing device to carry out some types of cryptographic processing. The encryption engine 150 is a circuit that applies an encryption algorithm to transform input plaintext data into output ciphertext data using one or more control inputs, such as an encryption key. The encryption algorithm can be symmetrical so that subsequent presentation of the ciphertext as an input to the engine produces the original plaintext. Any number of forms of encryption algorithms and other cryptographic functions can be applied to the data as desired.

Figure 5:
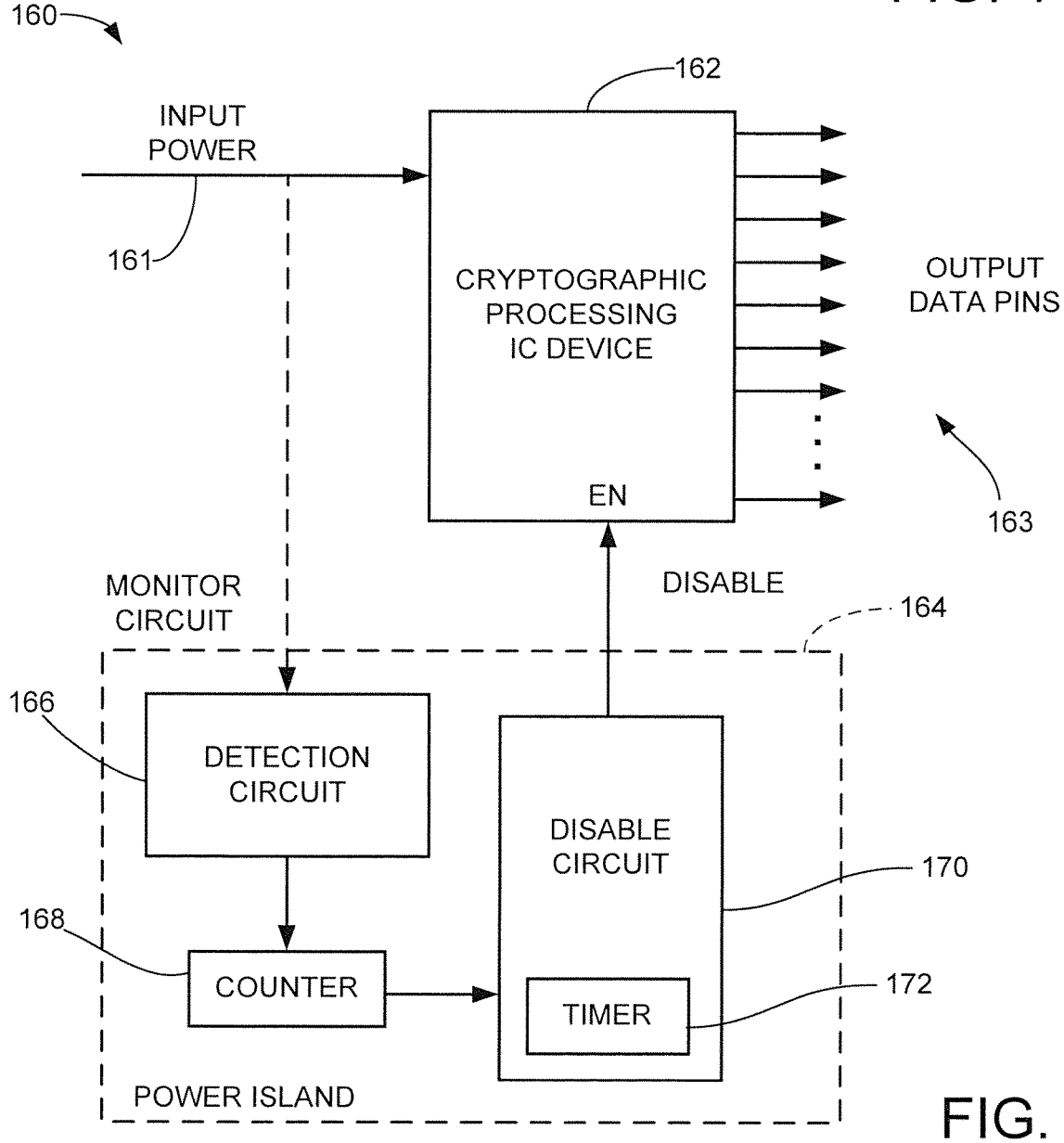
FIG. 5 illustrates a security circuit of the data storage device in some embodiments configured to protect against a power jitter attack.

FIG. 5 is a functional block representation of a data security circuit 160 implemented in each of the data storage devices of FIGS. 1-3 in accordance with some embodiments. The data security circuit receives input power via an input power line 161 from the power management block 136 (see FIGS. 2-3). This power is provided to a cryptographic processing IC device 162 ("crypto IC") which perfothis one or more cryptographic operations upon input data such as, but not limited to, the encryption processing described above in FIG. 4. The crypto IC 162 may be incorporated into the controller SOC or some other aspect of the associated storage device. The input voltage on the power line 161 can be a source voltage having a selected magnitude, such as nominally +3.3V (plus or minus some acceptable tolerance), or some other voltage magnitude value.

A monitor circuit 164 is configured to monitor the status of the input power line 161 in an effort to detect a jitter attack, which in this case may involve repeated toggling of the input voltage in an effort to place a set of output data pins 163 of the IC device 162 into an intermediate state.

The monitor circuit 164 in FIG. 5 is supplied with electrical power using a separate source or power line arrangement to that used to supply the crypto IC 162. In some cases, the monitor circuit 164 may be arranged on a power island portion of the controller SOC such that the circuit remains powered and active even if the crypto IC 162 is transitioned to a reduced power mode (e.g., deactivated, standby power level, etc.). In this way, the monitoring circuit 164 remains in an active state at times when the input power to the crypto IC 162 has been removed or is otherwise disturbed.

The monitor circuit includes a detection circuit 166, a counter 168 and a chip disable circuit 170, although other configurations can be used. The detection circuit 166 can include a comparator or similar thresholding circuit to detect changes in the steady state power state on line 161. The counter 168 captures the occurrence of anomalous events associated with the input signal line over a specified interval or time period. This enables the circuit to detect the presence of applied jitter during an attack while filtering out normal excursions that may arise during normal operation.

When the characteristics of the input power on line 161 are determined to be indicative of a potential jitter attack, the disable circuit 170 operates to temporarily disable the crypto IC 162. In some cases, an enable/disable input (EN) of the crypto IC 162 may be set to an appropriate level by the disable circuit 170 to interrupt operation and clear the device. A timer 172 or other mechanism may be used to set the duration of time during which the crypto IC 162 is deactivated, after which the device can be re-enabled and resume operation.

The timer mechanism can further be used to filter the output of the counter circuit 168 to distinguish between a potential jitter attack and normal signal variations. It will be appreciated that, even if a jitter attack is not underway, significant amounts of jitter from other sources, such as variations in source voltage from an external device, may affect the operation of the crypto IC 162, making it prudent under such circumstances to temporarily disable the device until the condition is resolved.

Figure 6:
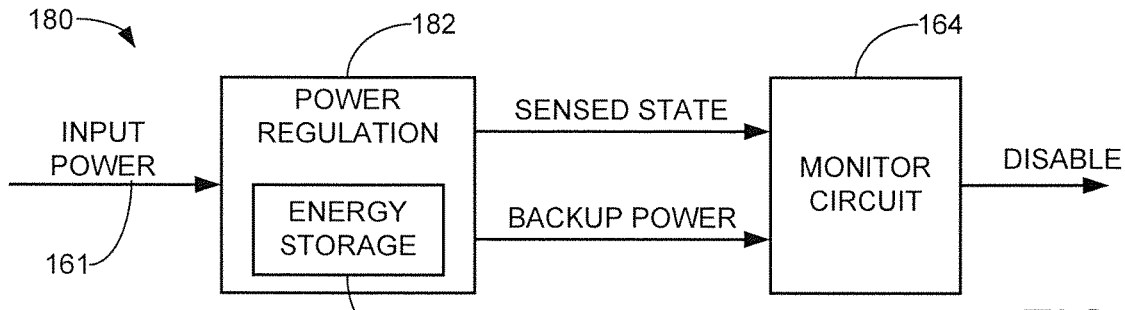
FIG. 6 shows another security circuit configuration in some embodiments to protect against a power jitter attack.

FIG. 6 shows an alternative data security circuit 180 similar to the configuration provided in FIG. 5. In FIG. 6, the data security circuit 180 does not use a separate power island to maintain power to the monitor circuit 164. Instead, the input power supplied on line 161 to the crypto IC 162 is also supplied to a local power regulation circuit 182.

The circuit 182 includes the use of an energy storage element 184, such as a capacitor, an electrical battery, etc., to provide backup power as well as a sensed state input to the monitor circuit 164. As before, the presence of sufficient accumulations of detected anomalous events in the input signal will be sufficient to cause the monitor circuit 164 to temporarily disable the crypto IC 162 (see FIG. 5).

Figure 7:
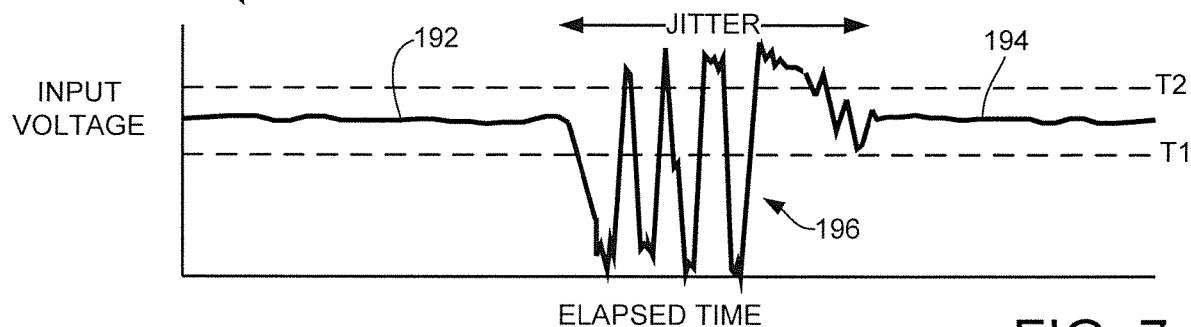
FIG. 7 is a graphical representation of a power line voltage undergoing an exemplary power jitter attack.

FIG. 7 is a graphical representation of an input signal curve 190. The curve 190 represents a magnitude of electrical power (in this case, voltage) supplied on the input power line 161 in FIGS. 5-6 over an interval of elapsed time. It is contemplated that the input voltage is normally maintained at a nominal value, such as 3.3 VDC, for use by the crypto IC 162.

Steady state levels for the input voltage are generally denoted at regions 192 and 194 in the curve 190. Zone 196 represents the application of electrical jitter to the input voltage. In this case, the jitter is represented as a series of alternating spikes, or pulses, providing voltage excursion events that cross one or more thresholds T1 and/or T2.

As noted above, during a jitter attack, these and other forms of anomalous events may be intentionally induced in an effort to place the crypto IC 162 into an indeterminate state. The monitor circuit 164 can be configured to accumulate a count of such anomalous events and declare an unsafe condition accordingly (e.g., disable the crypto IC and other circuitry as required).

Figure 8:
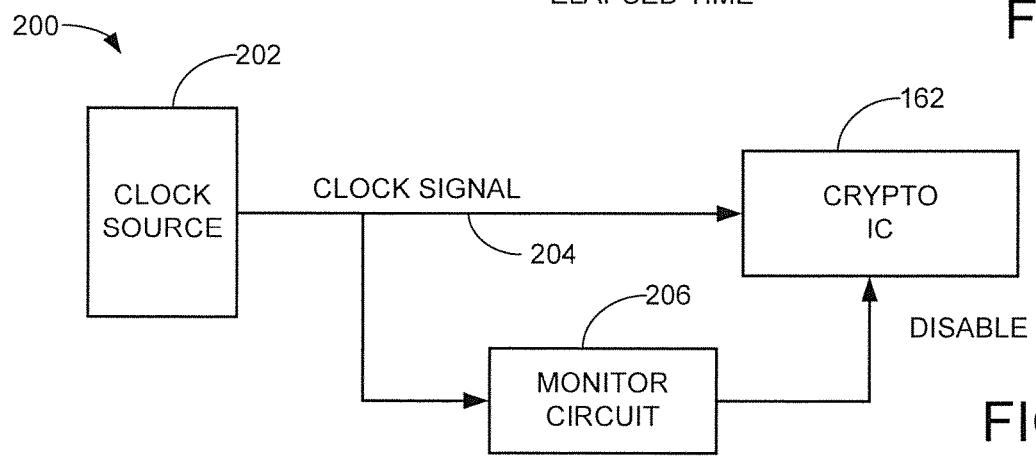
FIG. 8 shows another security circuit of the data storage device in some embodiments configured to protect against a clock power attack.

FIG. 8 shows another data security circuit 200 in accordance with further embodiments. The data security circuit 200 is configured to monitor an input signal in the form of a clock signal. It is contemplated that the clock signal will nominally have a fixed frequency suitable for use by the crypto IC 162, although variable clock frequencies can be used as required. While a traditional nominally "square wave" clock signal is contemplated, other forms can be used including other shapes (e.g., triangular patterns, etc.), variable durations (e.g., pulse-width modulated signals), etc.

The clock signal is output by a clock source circuit 202 on a clock signal line 204 to the crypto IC 162, which uses various features of the clock signal, such as selected leading or trailing edges, to clock internal circuit elements associated with a cryptographic processing of data.

The clock signal is provided as an input to a monitor circuit 206, which as before, is configured to detect the presence of jitter in the clock signal and, when sufficiently pronounced, temporarily disable the crypto IC 162. The construction of the monitor circuit 206 can vary, but can include variable clock oscillator (VCO) and phase lock loop (PLL) circuitry to monitor abrupt frequency variations in the frequency and other characteristics of the clock signal, as well as counter and disable circuitry as described in FIG. 5. By locking the PLL to the frequency of the input clock signal, changes in gain or other feedback adjustments necessary to maintain this locked state can be used as an indicator that large changes are being supplied to the input clock signal.

Each detected frequency variation in the input clock frequency beyond a predetermined threshold will be accumulated as an anomalous event. When a sufficient number of events have been detected over a predetermined time period, the circuit can declare an unsafe condition and temporarily suspend further operation of the crypto IC.

Figure 9:
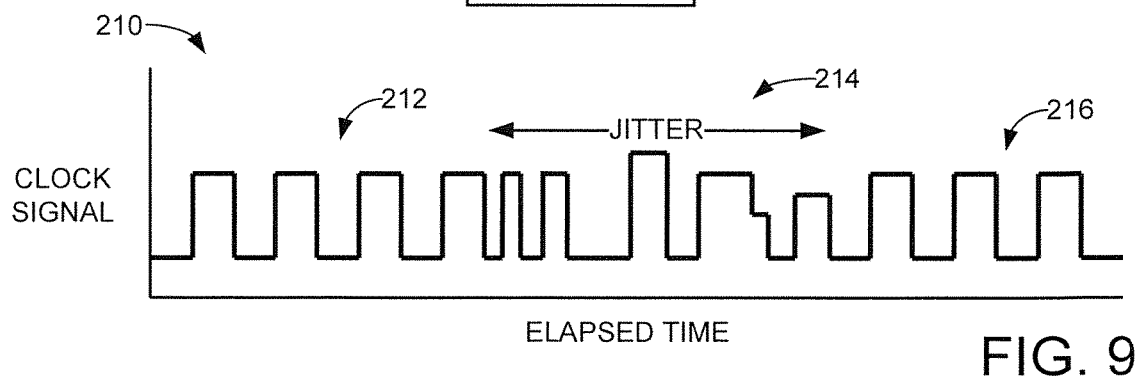
FIG. 9 is a graphical representation of a clock signal input undergoing an exemplary clock jitter attack.

FIG. 9 provides a graphical representation of an input signal curve 210 corresponding to the clock signal on line 204 in FIG. 8. It is contemplated that the clock signal is normally supplied at a selected, fixed frequency such as on the order of several hundred MHz or more, as indicated by steady state regions 212 and 216.

Intermediate zone 214 represents the application of electrical jitter to the clock signal. In this case, various abrupt changes in the frequency, pulse width, cycle time, amplitude and shapes of leading/trailing edges can arise as a result of the clock jitter. These can be induced by an attacker interfering with the operation of the clock source 202 and, as discussed above, can be applied in an effort to get the crypto IC to an indeterminate state.

Figure 10:
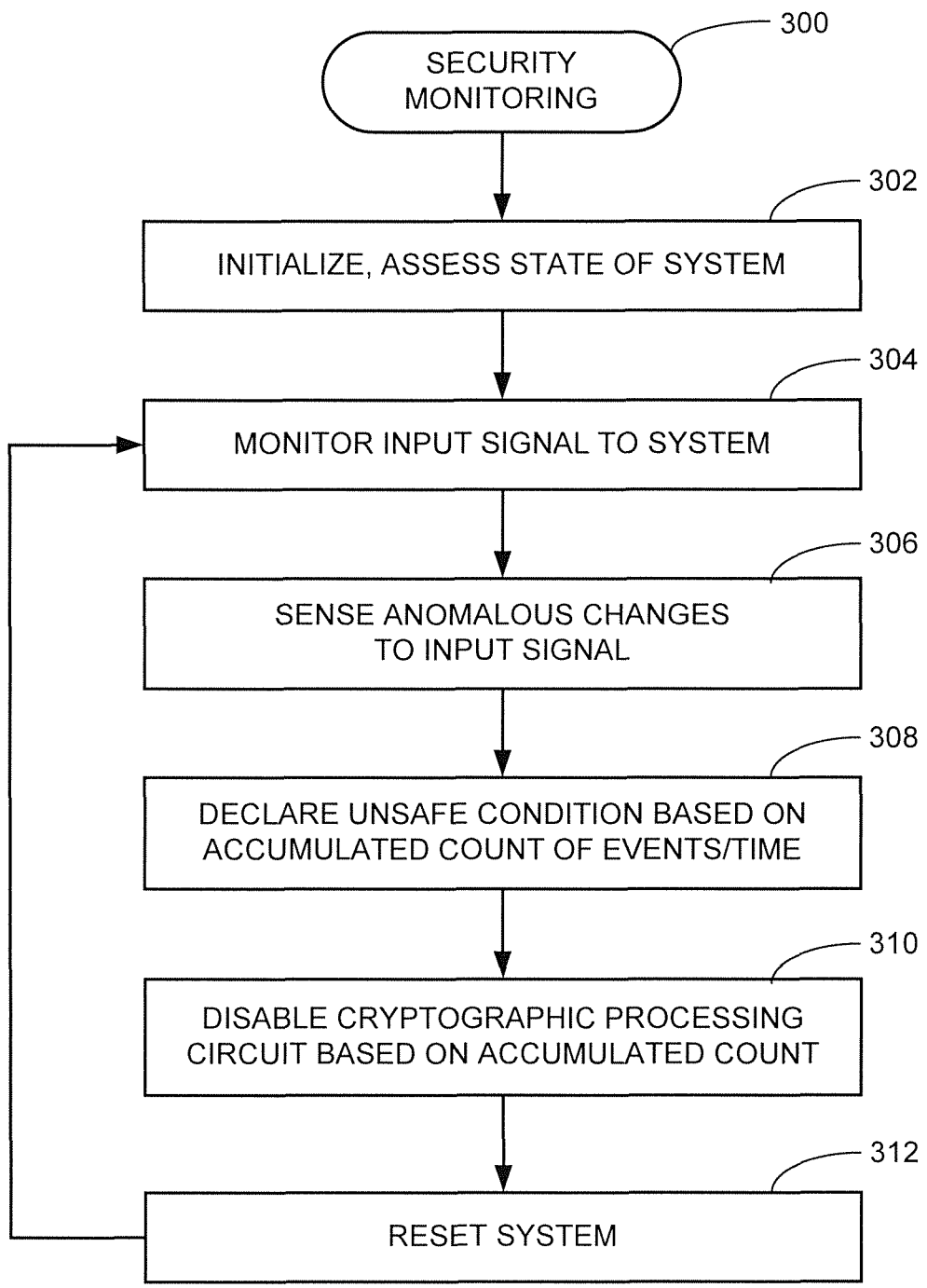
FIG. 10 is a flow chart for a security monitoring routine executed by the data storage device in some embodiments.

FIG. 10 provides a flowchart for a security monitoring routine 300 to summarize the foregoing discussion. The routine may represent a background sequence that is carried out by the associated data storage device during normal operation in which data sets are transferred between the storage media and the host device.

Initially, a data security circuit such as in FIG. 5-6 or 8 operates to transition to an active condition and assess the current state of the system, step 302. At this point the monitor circuit 164 commences with the monitoring of the input signal levels to the cryptographic portions of the system at step 304. This may include an accumulation of anomalous events detected in the input signal over elapsed periods of time.

At such time that a sufficient number of anomalous events are detected over a specified unit of time, an unsafe condition is declared at step 308, and a cryptographic processing circuit such as the IC device 162 is disabled at step 310 based on the declared unsafe condition. This may include providing a disable level to an input pin or other feature. It is contemplated that disabling the circuit will result in a clearing of existing states within the system in the form of registers, latches, etc. sufficient to prevent an attacker from gaining knowledge of the internal processing based on the intermediate states of the output pins 172.

As desired, the monitor circuit may provide a system notification of the event to the top level controller portion of the SOC to enable further steps be taken, such as temporarily halting cryptographic processing operations, switching to another operation, etc. SMART logs (self-monitoring reliability analysis testing) or other data structures may be updated at this time to log the occurrence for future evaluation.

Once disabled, the system remains disabled for a suitable time period, after which the system is reset at step 312 and the system proceeds to continue the input power monitoring. Other recovery sequences may be applied.

While the foregoing examples have contemplated monitoring input power and clock signals, other forms of inputs may be additionally or alternatively monitored, if such inputs are susceptible to a jitter attack of the form described herein. Moreover, while the various examples have been presented in the context of a data storage device (e.g., HDD, SSD, hybrid, etc.), substantially any form of processing circuit that uses cryptographic processing can be protected in similar fashion.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
   a cryptographic processing integrated circuit (IC) configured to perform a cryptographic function on a set of input data to generate a corresponding set of transformed output data;
   an input line configured to provide an input signal used by the cryptographic processing IC during execution of the cryptographic function; and
   a monitor circuit configured to monitor the input signal at a connection point connected to the input line upstream of the cryptographic processing IC and to output a disable signal to the cryptographic processing IC to temporarily disable the cryptographic processing IC responsive to a detection of time-varying changes to the input signal indicative of a potential jitter attack upon the cryptographic processing IC, the cryptographic processing IC prevented from performing the cryptographic function on any input data while the cryptographic processing IC remains disabled.

2. The apparatus of claim 1, wherein the input signal comprises electrical power from a power source that is supplied to the cryptographic processing IC using the input line, the monitor circuit is connected in parallel with the cryptographic processing IC to monitor an input source voltage on the input line having a nominal magnitude, and the monitor circuit outputs the disable circuit to the cryptographic processing IC responsive to a detection of variations in the monitored input source voltage that exceed a predetermined threshold.

3. The apparatus of claim 2, wherein the time-varying changes comprise detection of a toggling operation in which the voltage is repetitively transitioned from the nominal value to a value of nominally zero volts.

4. The apparatus of claim 1, wherein the input signal comprises a clock signal from a clock source that is supplied to the cryptographic processing IC at a selected clock frequency, the monitor circuit is connected in parallel with the cryptographic processing IC to monitor changes in the clock signal from the selected clock frequency, and the monitor circuit outputs the disable signal to the cryptographic processing IC responsive to a measured frequency of the clock signal exceeding a predetermined frequency threshold above the selected clock frequency.

5. The apparatus of claim 1, wherein the monitor circuit comprises a detector circuit that detects a sequence of anomalous events in the input signal, accumulates a count of the anomalous events, and declares an unsafe condition responsive to the count of the anomalous events exceeding a predetermined threshold over a predetermined interval of time.

6. The apparatus of claim 5, wherein the monitor circuit further comprises a disable circuit that provides an enable/disable input to the cryptographic processing IC to disable continued operation of the cryptographic processing IC.

7. The apparatus of claim 1, wherein the input signal is a source voltage supplied to the cryptographic processing IC over a predetermined voltage range to supply electrical power to enable the cryptographic processing IC to carry out the cryptographic function and the monitor circuit accumulates a count of voltage transitions in the source voltage with respect to at least one predetermined voltage threshold level outside the predetermined voltage range to detect the potential jitter attack.

8. The apparatus of claim 1, further comprising a timer circuit that initiates a selected time interval responsive to the disabling of the cryptographic processing IC, wherein the cryptographic processing IC remains disabled over an entirety of the selected time interval, and wherein the cryptographic processing IC resumes execution of the cryptographic function responsive to the conclusion of the selected time interval.

9. The apparatus of claim 1, wherein the input signal is a clock signal supplied to the cryptographic processing IC to clock transitions of gates during execution of the cryptographic function, and wherein the monitor circuit monitors a frequency of the clock signal, accumulates a count of frequency variations over a selected time interval to detect the potential jitter attack, and outputs the disable signal to the cryptographic processing IC responsive to the accumulated count of frequency variations exceeding a predetermined threshold.

10. The apparatus of claim 9, further comprising a timer circuit that denotes a selected time interval, and wherein the cryptographic processing IC is disabled responsive to the accumulated count of frequency variations occurring within the selected time interval.

11. The apparatus of claim 1, wherein the cryptographic processing IC forms a portion of a system on chip (SOC), and the monitor circuit is on a power island of the SOC that continuously receives electrical power from a source independently of application of electrical power to the cryptographic processing IC.

12. A data storage device, comprising:
a non-volatile memory (NVM);
a controller circuit configured to direct a transfer of data between the NVM and a host device, the controller circuit comprising a cryptographic processing circuit configured to perform a cryptographic function on a set of input data to generate a corresponding set of transformed output data, the cryptographic processing circuit receiving an input signal from an input line to facilitate execution of the cryptographic function; and
a monitor circuit configured to monitor the input signal at a connection point upstream of the cryptographic processing circuit and to output a disable signal to the cryptographic processing circuit to temporarily disable the cryptographic function on the input data for a predetermined elapsed period of time determined by a timer circuit responsive to a detection of time-varying changes to the input signal indicative of a potential jitter attack, the cryptographic processing circuit prevented by the monitor circuit from performing the cryptographic function on any input data while disabled, the cryptographic processing circuit enabled by the monitor circuit to resume the cryptographic function at a conclusion of the predetermined elapsed period of time.

13. The data storage device of claim 12, wherein the input signal comprises electrical power from a power source that is supplied to the cryptographic processing circuit using the input line, and the monitor circuit outputs the disable signal responsive to detection of variations in a voltage level of the electrical power on the input line that exceed a predetermined threshold.

14. The data storage device of claim 12, wherein the input signal comprises a clock signal from a clock source that is supplied to the cryptographic processing circuit at a selected clock frequency, and the monitor circuit outputs the disable signal response to detection of variations in frequency of the clock signal above the selected clock frequency.

15. The data storage device of claim 12, wherein the monitor circuit comprises a detector circuit that detects a sequence of anomalous events in the input signal, accumulates a count of the anomalous events, and declares an unsafe condition responsive to the count of the anomalous events exceeding a predetermined threshold over a predetermined interval of time, and wherein the monitor circuit further comprises a disable circuit that provides an enable/disable input to disable continued operation of the cryptographic processing circuit.

16. The data storage device of claim 12, wherein the cryptographic processing circuit is configured to encrypt data sets prior to storage to the NVM.

17. A method comprising:
supplying an input signal to a cryptographic processing IC;
using the cryptographic processing IC to execute a cryptographic function on a set of input data to generate a corresponding set of transformed output data;
monitoring the input signal during the execution of the cryptographic function at a connection point upstream of the cryptographic processing IC; and
disabling the execution of the cryptographic function responsive to a detection of time-varying changes to the input signal at the connection point indicative of a potential jitter attack, the cryptographic processing IC prevented from performing the cryptographic function on any input data while the cryptographic processing IC remains disabled.

18. The method of claim 17, wherein the input signal comprises a source voltage from a power source that is supplied to the cryptographic processing circuit using the input line, and the monitoring step comprises accumulating a count of voltage transitions in the source voltage with respect to at least one predetermined voltage threshold level.

19. The method of claim 17, wherein the input signal comprises a clock signal from a clock source that is supplied to the cryptographic processing circuit at a selected clock frequency, and the monitoring step comprises accumulating a count of frequency variations in the clock signal with respect to a predetermined elapsed period of time.

20. The method of claim 17, wherein the method further comprises:
initiating a timer circuit to provide a predetermined time interval during which the cryptographic processing circuit is disabled; and
removing the disable signal from the cryptographic processing circuit at a conclusion of the predetermined time interval to enable the cryptographic processing circuit to resume execution of the cryptographic function.

* * * * *